(12) United States Patent
Edwards

(10) Patent No.: US 8,200,971 B2
(45) Date of Patent: Jun. 12, 2012

(54) METHOD FOR THE PROVISION OF A NETWORK SERVICE

(75) Inventor: John Edwards, London (GB)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 12/565,671

(22) Filed: Sep. 23, 2009

(65) Prior Publication Data

US 2010/0082979 A1    Apr. 1, 2010

Related U.S. Application Data

(63) Continuation-in-part of application No. 11/534,604, filed on Sep. 22, 2006.

(60) Provisional application No. 60/727,525, filed on Oct. 17, 2005.

(30) Foreign Application Priority Data

Sep. 23, 2005    (GB) .................................. 0519466.7

(51) Int. Cl.
    *H04L 9/00*          (2006.01)
(52) U.S. Cl. ........................................................ 713/168
(58) Field of Classification Search .................. 713/168, 713/153; 709/203, 222, 227
    See application file for complete search history.

(56) References Cited

U.S. PATENT DOCUMENTS

| | | | |
|---|---|---|---|
| 4,405,829 A | 9/1983 | Rivest et al. | |
| 4,866,707 A | 9/1989 | Marshall et al. | |
| 4,888,800 A | 12/1989 | Marshall et al. | |
| 4,933,969 A | 6/1990 | Marshall et al. | |
| 6,052,730 A | 4/2000 | Felciano et al. | |
| 6,067,620 A | 5/2000 | Holden et al. | |
| 6,081,900 A * | 6/2000 | Subramaniam et al. | 726/19 |
| 6,212,636 B1 | 4/2001 | Boyle et al. | |
| 6,483,921 B1 | 11/2002 | Harkins | |
| 6,643,698 B2 | 11/2003 | Holden et al. | |

(Continued)

FOREIGN PATENT DOCUMENTS

EP    1 533 982 A3    5/2005

(Continued)

OTHER PUBLICATIONS

Inoue, Atsushi et al., IP Layer Security and Mobility Support Design Policy and an Implementation, International Switching Symposium 1997, XVI World Telecommunications Congress Proceedings, Sep. 21-26, 1997, pp. 571-577.

(Continued)

*Primary Examiner* — Samson Lemma

(57) ABSTRACT

Methods and systems provide for sharing information between computer networks in which the information to be shared is required at one location (e.g. for the provision of a data-processing service) but is only available at a separate location. The information may be deliberately absent (e.g. for privacy reasons) or may be unavailable as an artifact of the computer network(s) involved. For the provision of a data-processing service, where several different devices on one network may service contiguous requests from a client device on another network according to a load-balancing strategy, data is propagated once only through the service network. Network communication software is subsequently amended to provide the minimal information necessary for a device on the service network to retrieve the information pertinent to the client device and necessary for its service. Therefore, a web-based single sign-on scheme can operate over HTTP to authorize data-processing services, such as web-filtering services.

44 Claims, 6 Drawing Sheets

Diagram showing the acquisition and execution of PIM, in conjunction with an authentication procedure

U.S. PATENT DOCUMENTS

| | | |
|---|---|---|
| 6,839,717 B1 | 1/2005 | Motoyama et al. |
| 7,240,199 B2 | 7/2007 | Tomkow |
| 7,246,378 B1 | 7/2007 | Marvit et al. |
| 7,277,549 B2 | 10/2007 | Olkin et al. |
| 7,454,785 B2 | 11/2008 | Kerstens et al. |
| 7,607,018 B2 | 10/2009 | Baxter et al. |
| 7,660,989 B2 | 2/2010 | Tomkow |
| 7,707,624 B2 | 4/2010 | Tomkow |
| 7,886,008 B2 | 2/2011 | Tomkow et al. |
| 2001/0034622 A1 | 10/2001 | Davis |
| 2002/0007415 A1* | 1/2002 | Douglis et al. ............ 709/230 |
| 2002/0026328 A1 | 2/2002 | Westerkamp et al. |
| 2002/0062230 A1 | 5/2002 | Morag et al. |
| 2002/0120697 A1 | 8/2002 | Generous et al. |
| 2002/0138728 A1 | 9/2002 | Parfenov et al. |
| 2002/0194121 A1 | 12/2002 | Takayama |
| 2003/0074552 A1 | 4/2003 | Olkin et al. |
| 2003/0172120 A1 | 9/2003 | Tomkow et al. |
| 2004/0088539 A1 | 5/2004 | Infante et al. |
| 2004/0123159 A1 | 6/2004 | Kerstens et al. |
| 2004/0148500 A1 | 7/2004 | Olkin et al. |
| 2004/0196978 A1 | 10/2004 | Godfrey et al. |
| 2004/0205330 A1 | 10/2004 | Godfrey et al. |
| 2004/0221014 A1 | 11/2004 | Tomkow |
| 2005/0009502 A1 | 1/2005 | Little et al. |
| 2005/0010766 A1 | 1/2005 | Holden et al. |
| 2005/0021963 A1 | 1/2005 | Tomkow |
| 2005/0026328 A1 | 2/2005 | Watanabe |
| 2005/0071508 A1 | 3/2005 | Brown et al. |
| 2005/0102520 A1 | 5/2005 | Baxter et al. |
| 2005/0119955 A1 | 6/2005 | Dang et al. |
| 2005/0163320 A1 | 7/2005 | Brown et al. |
| 2005/0198511 A1 | 9/2005 | Tomkow |
| 2005/0271246 A1 | 12/2005 | Sharma et al. |
| 2006/0112165 A9 | 5/2006 | Tomkow et al. |
| 2007/0074018 A1 | 3/2007 | Edwards |

FOREIGN PATENT DOCUMENTS

| | | |
|---|---|---|
| GB | 2375918 A | 11/2002 |
| WO | WO 0073876 A2 | 12/2000 |

OTHER PUBLICATIONS

Hunt, "Modify Headers Overview", http://modifyheaders.mozdev.org/, (1 page).

Gartner, "Gartner Says Security Delivered as a Cloud-Based Service Will More Than Triple in many Segments by 2013", Press Release, Stamford, CT, Jul. 2008, (3 pages).

Hayes, "Cloud Computing", Communications of the ACM, vol. 51, No. 7, Jul. 2008, (pp. 9-11).

Rietta et al., "Firefox Extension Development Tutorial: Overview", Rietta.com, Rietta Inc., Johns Creek, GA, 1999-2012, (4 pages).

Jia C., "How to Attach to Browser Helper Object (BHO) with C# in two minutes", The Code Project, Aug. 10, 2007, (6 pages).

Inoue, "IP Layer Security and Mobility Support Design Policy and an Implementation", XP-000720565, XVI World Telecom Congress Proceedings, 1997, (7 pages).

* cited by examiner

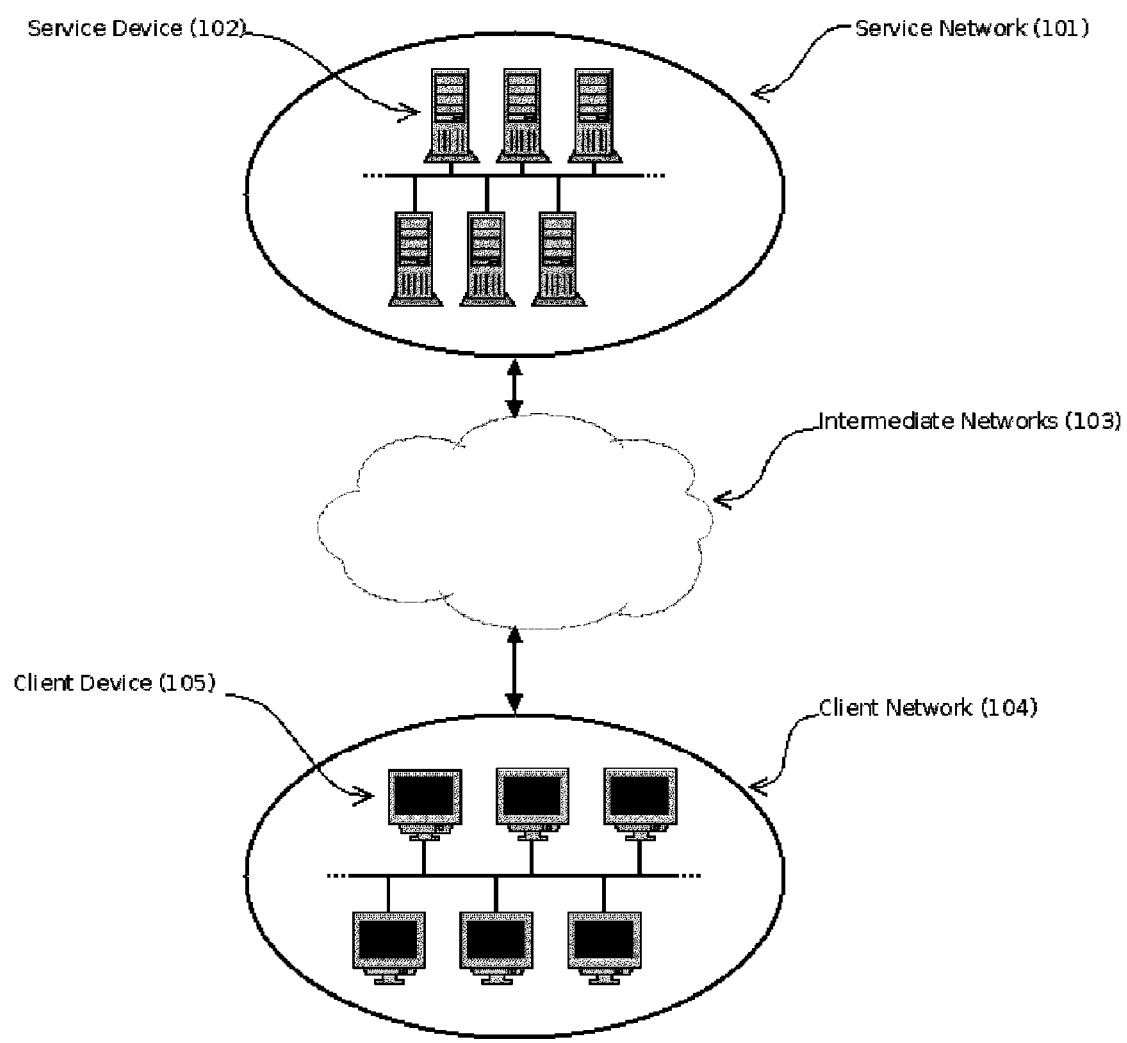
Figure 1: A client network and a separate service network

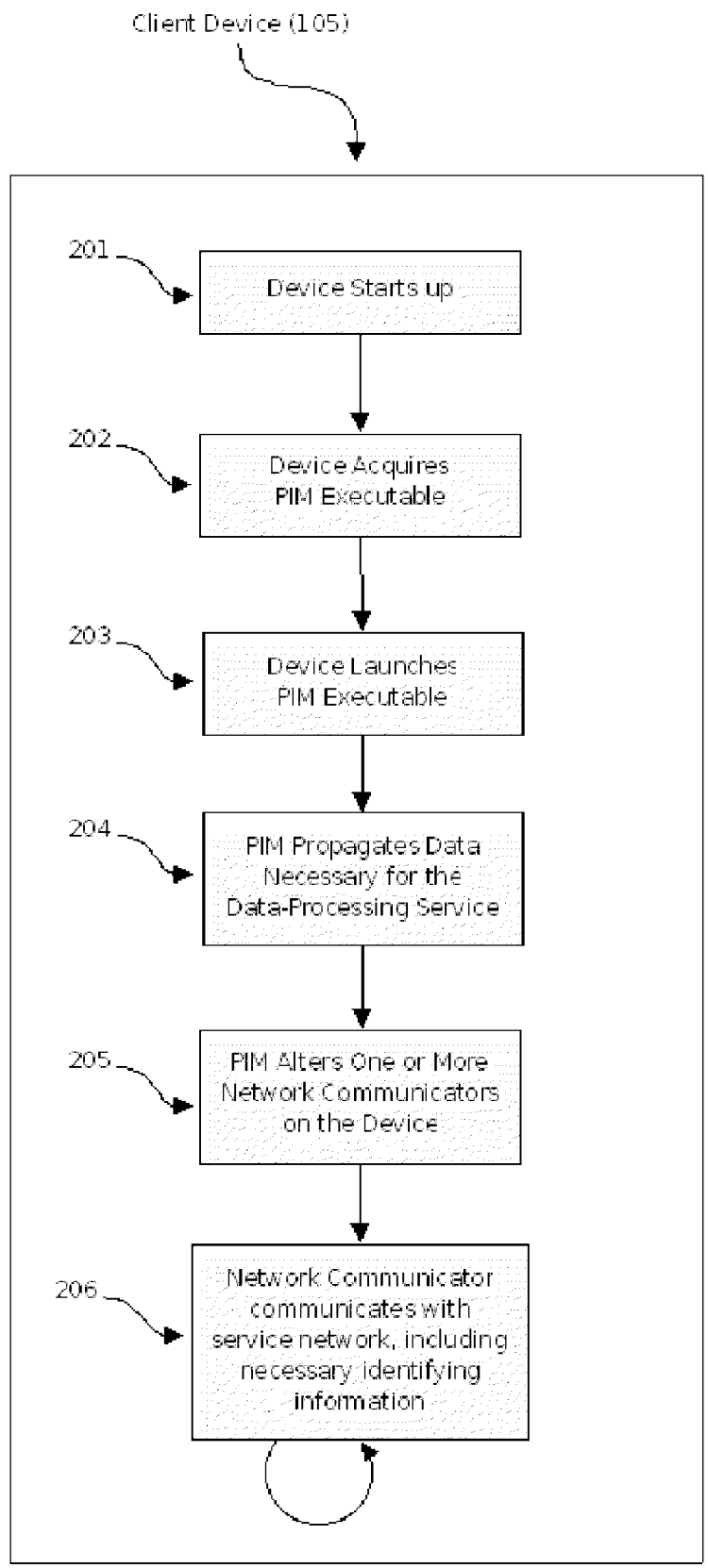
Figure 2: Client device startup and operation, incorporating PIM

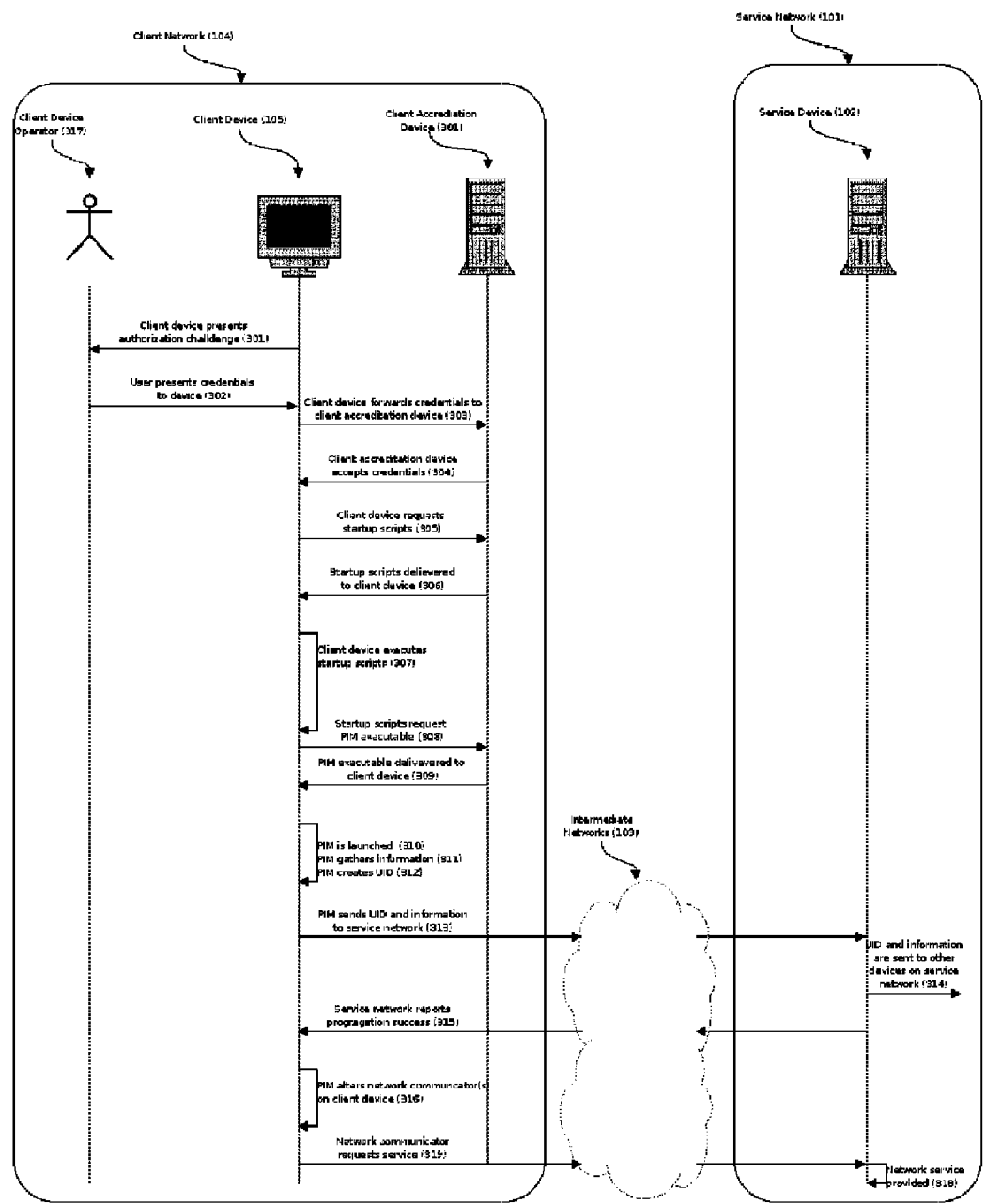
Figure 3: Diagram showing the acquisition and execution of PIM, in conjunction with an authentication procedure

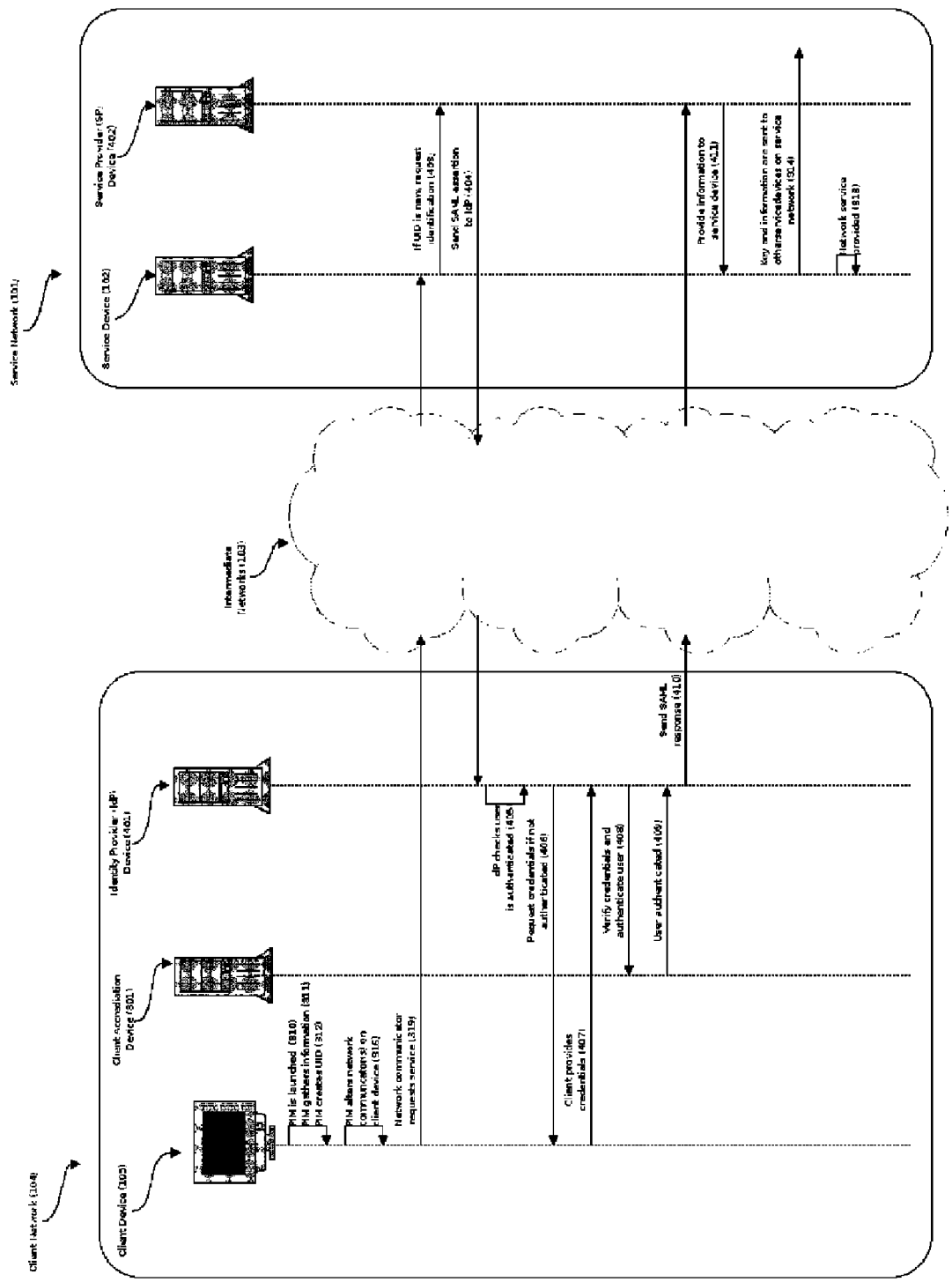
Figure 4: Acquisition of user-identity information using single sign-on infrastructure

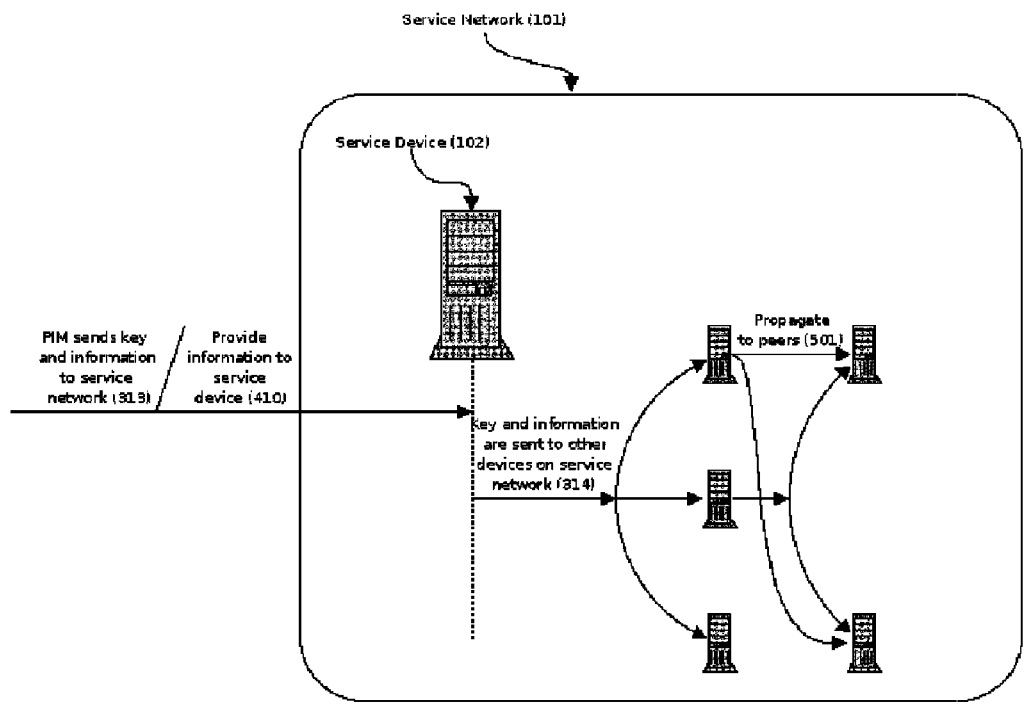
Figure 5: Data propagation using a peer-to-peer transport mechanism
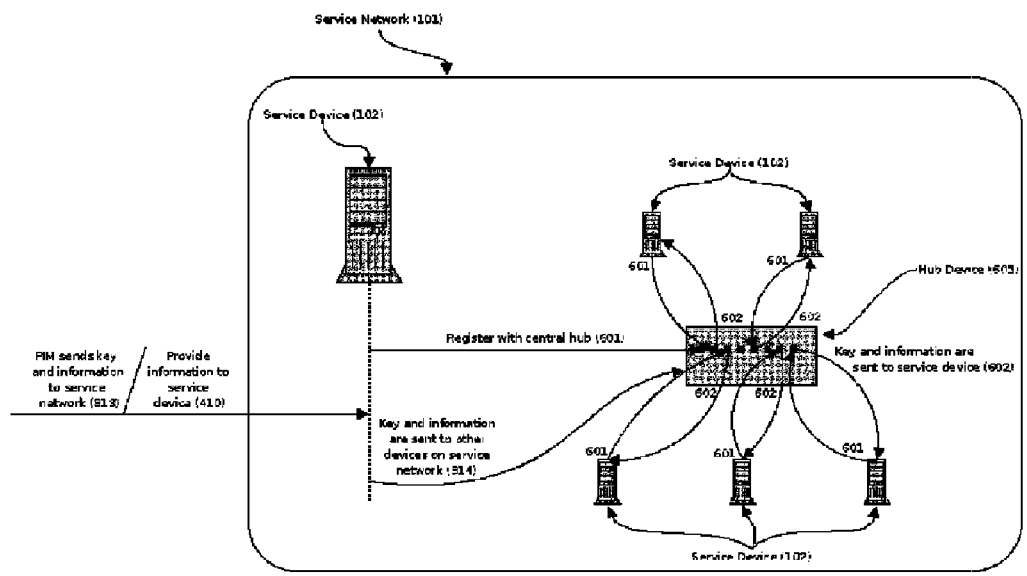
Figure 6: Data propagation using a central hub

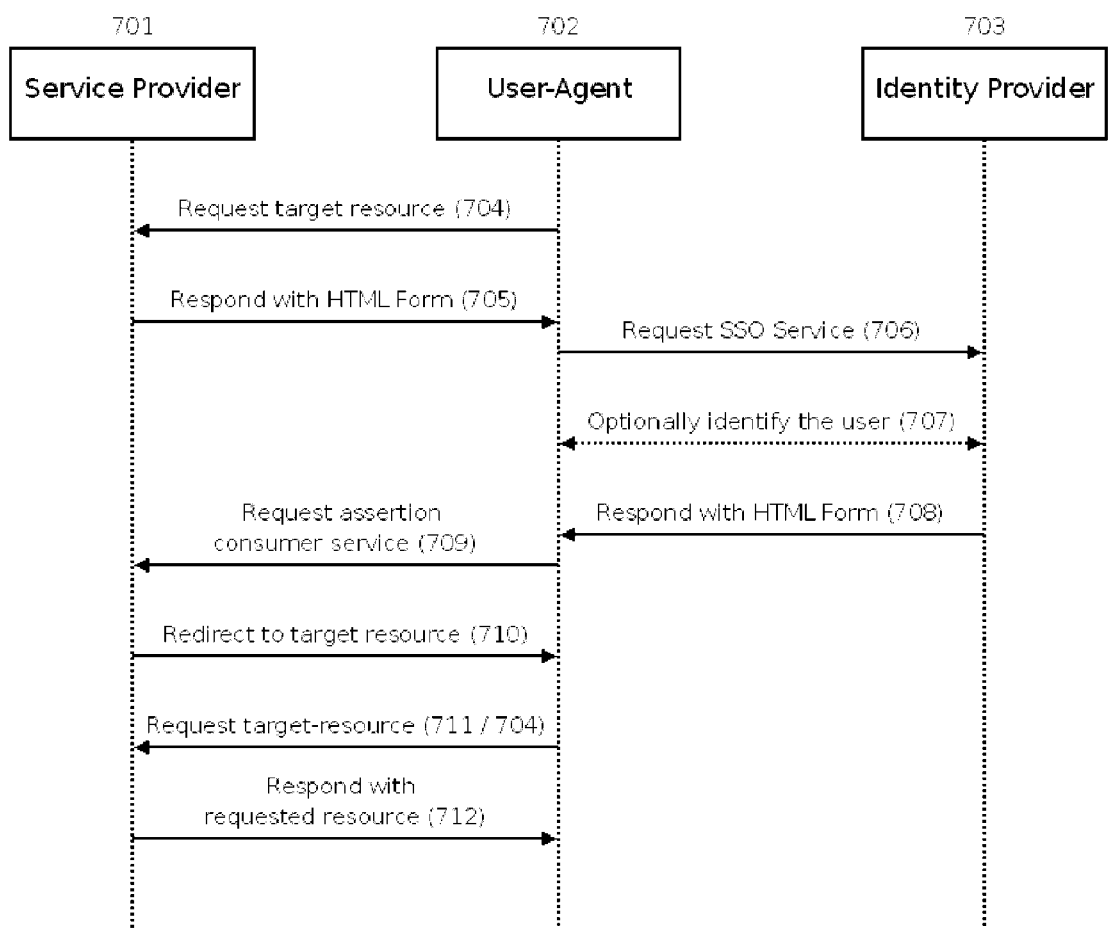
Figure 7: A simple web-based single sign-on sequence

METHOD FOR THE PROVISION OF A NETWORK SERVICE

CROSS-REFERENCE TO RELATED APPLICATIONS

This application is a continuation-in-part of and hereby incorporates by reference assignee's pending application, U.S. Ser. No. 11/534,604, entitled "Network Communications", filed Sep. 22, 2006, which claims benefit to provisional Application No. 60/727,525 filed Oct. 17, 2005.

BACKGROUND OF THE INVENTION

1. Field of the Invention

The present invention relates to network communications and provides methods, systems and related software components for communicating information between networked processors, and applications running on those processors. In its preferred form, the invention is particularly, although not necessarily exclusively, applicable to communication between a user processor (e.g within a corporate environment) and the processor of an Internet-level network processing service (e.g. a web-security service)

2. Description of the Related Art

Traditionally corporate software has been installed on each individual workstation within the corporate network. This approach has the advantage of locating the software on the same physical machine as the data on which it operates, however it also has several disadvantages, particularly with regards to maintenance. Installing a new version of the software involves creating a catalog of all machines where the software is installed, and then sending staff to each individual machine in turn to upgrade the software.

This maintenance cost, which is substantial, has led organizations to gradually remove software from the workstation, and instead provide the software as a network data-processing service. Initially such services were focused on security concerns, with anti-virus software moved off the desktop and onto the network perimeter, scanning web, e-mail and instant messaging (IM) traffic as it passed through the corporate network to the workstation itself. However such methods still present maintenance costs: notably maintenance of server hardware & software and network infrastructure. Thus it has become common to outsource such services: the services are hosted on an external network and accessed by workstations (or client devices) via the Internet.

This mechanism for providing data services over a network has become known as "software-as-a-service" (SaaS) or "cloud computing" and has seen significant growth in recent years [Hayes 2008, Gartner 2008]. The advantages it provides are that the maintenance of the software and hardware are taken care of by a third party, which specializes in this service, and handles all updates of hardware and software. Further, as the service is provided to several users, the service-provider may have several servers providing the service, allowing it to freely route around hardware and software failures.

There are challenges associated with this method of providing data-processing services, however. One such issue is that as the server devices providing the service are on a completely separate network to the client workstation, so information available to the workstation may not be available to the service device. Typically this is due to necessary security measures implemented on the client network. Such information may, for example, include user-identifying information, necessary to provide different functionality to different users, or—in the case of a web-filtering service—record users' web-surfing habits. However it is not limited to such data: depending on the networked data-processing being provided, there are many types and volumes of data which may need to be transferred.

Previous work in the art has sought to re-transmit [Edwards 2006] this data with each network communication in an encrypted form. By re-transmitting the data with each network communication, it is possible for the service to be provided by several server devices on the service network, with each communication optionally being handled by a separate device, according to some load-balancing strategy. This method has several disadvantages: firstly, by re-transmitting the data with every network communication, it increases the bandwidth required to provide the service; secondly, in order to ensure confidentiality, the data must be encrypted by the client device, and decrypted by the service device on receipt, which increases the processing burden on both sides; lastly, the requirement to retransmit and encrypt places significant limits on the data that can be transmitted (and therefore used) to ensure the service is provided in a timely manner.

Thus there is a need, where a data-service is provided on a service network consisting of several service-devices which handle different requests from different client devices on a different client network, for a method to securely and reliably provide data required by the service-devices but available only on the client network. Such a service, to be practicable, must cause minimal disruption to client devices and network.

SUMMARY OF THE INVENTION

The present invention provides a method and a system for the secure and reliable provision of information to a service-network consisting of several service-devices, such information being necessary to the provision of a data-processing service by those service-devices, and such information further being available on a wholly separate client network consisting of client devices issuing data-processing requests. The invention may be used to provide, for example, user-identifying information (e.g. user-name, groups the user belongs to, IP address of the user's PC) to a remote data-processing service, such as a web-filtering service placing limits on which sites a user may visit. The invention may also be used to transmit significant working data to a data-processing service, such as selected files on a server on the client-network (to which the service-devices have no access), so that those files may be accessible to the service-devices as they provide their data-processing service.

According to the present invention there is provided a method and a system for the provision of a network service as defined by the appended claims.

The core component of a preferred embodiment of this invention is the Passive Information Manager, or PIM, which periodically (e.g. during the start-up sequence performed by the client device) or on demand (e.g. if triggered via a web page which automatically detects the absence of a UID) creates a unique identifier (UID) that identifies either the current device or the current user of that device, gathers the necessary information, and securely transmits that information with the UID to a single device on the service network. This device persists the information in a data-store, indexed by the given UID. As the service network consists of several devices, each which may be asked to provide a data-processing service to the client device in the future, the service device operates to propagate the data with its associated UID to all other devices. PIM then alters the behavior of several network communicators on the client device, which may optionally include web-browsers (such as Mozilla Firefox or Microsoft Internet Explorer); e-mail clients (such as Mozilla Thunderbird or Microsoft Outlook); and online music applications (such as iTunes and Spotify), so that all subsequent communications issued by those network communicators contain the UID. On receipt of a network communication, the service-network routes the communication to a single service-device, which operates to extract the UID from the communication, use that UID to extract the necessary information from its data-store, and then use this information, and the contents of the network communication, to perform a data-processing service, and issue a response to the client device.

The propagation by the service device of the information to all other service devices may be carried out using a star-topology, wherein each service device makes itself known to a single hub device, which thereby accumulates a directory of all service devices, and through which a service device can then broadcast to all its peers a UID and its associated information. A separate, preferred, embodiment utilizes a peer-to-peer topology, wherein service devices dynamically make themselves known to other service devices reachable on the network, a subset of the devices operating to act as hubs (or seeds), which may transmit a UID and information to nearby service devices (known as peers). A service device, on receipt of a UID and information, will propagate it by transmitting to its peers, who will cooperatively work to propagate it further to their peers until it has been propagated throughout the network. Such a topology is resistant to device failures and therefore allows for the reliable transmission of data using unreliable devices and software. It should be readily apparent that the star-topology outlined above is nothing more than a special case of this peer-to-peer topology, consisting of a single seed device, to which all peer devices are known.

In a preferred embodiment, the present invention further incorporates a novel method for providing user-identifying information to a service-network using a distributed, single sign-on, networked authorization and authentication system, where the single sign-on system uses HTTP protocols.

There is thus provided in accordance with a preferred embodiment of the present invention a method for providing information available only on a client device, or client network, to all service devices on a service network, such information being necessary to the provision of a data-processing service by the service devices on the service network to the client devices on the client network. Such method includes the creation of a unique identifier (UID) and the aggregation of information on the client device, and the secure propagation of the UID and information among all service devices on a separate service network, by means of a peer to peer transmission, which in its simplest form consists of a single seed device aware of all peer devices. The method further provides for alteration of a plurality of network communicators on the client to include the UID within every network communication; the ability of every service-device to extract the UID from such a network communication and thereby access associated information stored in its data-store, and the provision of a data-processing service using the retrieved information and the contents of the network communication where appropriate.

There is moreover provided in accordance with a preferred embodiment of the present invention a system for providing a data-processing service, including: a network of service-devices which perform a data-processing service on the receipt of a network communication; a network of client-devices which issue such network communications using network communicators; optionally a plurality of networks through which the service and client networks are mutually accessible; software operating on a client device to determine a unique identifier (UID), aggregate information necessary for the provisioning of data-processing service, modify a plurality of network communicators on the client device such that every communication includes a UID, and issue that UID and information to a single service device; software on all service devices, which on receipt of a UID and information, operate to persist that information in a data-store indexed by UID, and propagate that UID and information to all other service devices; and lastly related software on service devices, which on receipt of a network communication with UID, operate to access in its data-store the information associated with that UID, and in conjunction with the network communication, use that information to provide a data processing service.

There is additionally provided in accordance with a preferred embodiment of the present invention a method for making user-identifying information available to a plurality of service-devices on a service network, such information being necessary for the provision of a data-processing service, the method including the steps of generating a unique identifier (UID) on the client device; amending a plurality of network communicators on the client device such that the UID is embedded in each network communication; receiving at a service-device a network communication with an unknown UID and so requesting a Service Provision (SP) device on the service network to acquire user identifying information using a Security Assertion Markup Language (SAML) request; the SP device using a SAML request to acquire login information from a publicly accessible Identity Provision (IdP) device on the client network; the service-device on receipt of this information storing the UID and the user-identifying information in its data-store indexed by UID, propagating the information throughout the network in a peer-to-peer manner, which in its simplest form consists of a single seed device aware of all peer devices, and providing the network processing service; all subsequent network communications with the UID being processed in the standard manner with the retrieved and disseminated data.

There further provided in accordance with a preferred embodiment of the present invention a system for providing a data-processing service, including: a network of service-devices which perform a data-processing service on the receipt of a network communication, such network additionally containing a Service Provision (SP) device; a network of client-devices which issue such network communications using a network communicator, such network additionally containing a publicly accessible Identity Provision (IdP) device; optionally a plurality of networks through which the service and client networks are mutually accessible; software operating on a client device to determine a unique identifier (UID) and modify a plurality of network communicators on the client device such that every communication includes a UID; software on all service devices, which on receipt of a UID operate to access user-identifying information in a data-store indexed by that UID and use it in conjunction with the network communication to provide a data-processing service; the same software on the same device operating, where no information is available, to acquire such information by means of a Security Assertion Markup Language (SAML) request addressed to an SP device, propagate information so-acquired to all other service devices in a peer-to-peer manner which in its simplest form consists of a single seed device aware of all available peers, and use the information to provide the data processing service; software on the SP device operating to, on receipt of a SAML request for user-identifying information, acquire that information by means of a SAML request to an IdP device and relay it to the service device; software on the IdP device operating, on receipt of a SAML request, to acquire login information from an authentication device, optionally by issuing a request for login credentials to the client device, and relay that information to the SP device.

In a preferred embodiment, the invention provides methods and systems for sharing information between computer networks in which the information to be shared is required at one location (e.g. for the provision of a data-processing service) but is only available at a separate location. The information may be deliberately absent (e.g. for privacy reasons) or may be unavailable as an artifact of the computer network(s) involved. For the provision of a data-processing service, where several different devices on one network may service contiguous requests from a client device on another network according to a load-balancing strategy, data is propagated through the service network. To minimize costs in processing time and network bandwidth data is propagated once only, preferably in an encrypted form. Network communication software is subsequently amended to provide the minimal information necessary for a device on the service network to retrieve the information pertinent to the client device and necessary for the provision of its service. Such invention thereby provides a facility for web-based single sign-on schemes operating over HTTP to authorize data-processing services, including HTTP data-processing services such as web-filtering services.

BRIEF DESCRIPTION OF THE DRAWINGS

Embodiments of the present invention will be more fully understood and appreciated from the following detailed description, taken in conjunction with the drawings in which:

FIG. 1 is a diagram illustrating a system of interconnected networks within which framework the invention may be implemented FIG. 2 is a flowchart illustrating the series of steps undertaken by a client device while starting up.

FIG. 3 is a block diagram illustrating an embodiment which generates a key and information locally and causes this information to be propagated throughout the service network FIG. 4 is a block diagram illustrating an embodiment which generates a key locally, acquires authentication information by means of a distributed, single sign-on authentication scheme, and propagates key and information throughout the service network FIG. 5 is a block diagram illustrating the process of propagating information throughout a service network in a peer to peer manner.

FIG. 6 is a block diagram illustrating the process of propagating information throughout a service network by way of a central hub, and FIG. 7 is a block diagram illustrating a simple, web-based single sign-on solution.

DETAILED DESCRIPTION OF THE PREFERRED EMBODIMENT

The present invention is concerned with the provision of a data-processing service by service devices on a service network, to client devices on a client network, where information accessible only on the client network is required by the service devices for the provision of the service. The invention provides a means to propagate such information with minimal usage of bandwidth, client computing resources, or service computing resources, and with minimal changes necessary to the client device or network. In the following description, as an example, we take the case of a web-filtering service, which restricts certain users' access to the Internet according to some policy, and therefore needs to be aware of users' identities, such information not being transmitted by web-browsers. It will, however, be evident that various modifications and changes may be made to such a specific exemplary embodiment without departing from the broader spirit and scope of the invention as set forth in the claims.

Reference is now made to FIG. 1 which illustrates a common network organization when providing a data-processing service. Network 104, the client network, consists of several client-devices (105). The client-devices issue requests to a service network 101 by means of network communicators for a data-processing service. Each request is handled by one of several service-devices (102) within the network, which may optionally issue a response back to the client. How a service device is chosen depends on the construction of the network: in one embodiment, a gateway device (not shown) may track the device-load for each device, which in a simple case could be the number of requests currently being handled, and on receipt of a new request, forward it to the least loaded device. Such a gateway device is commonly referred to as a load-balancer. A consequence of using a load-balancer is that a series of contiguous requests from a single client device may be handled by several different service devices, so one cannot rely on a service device having knowledge of a prior transaction on receipt of a new request.

Between the service network 101 and the client network 104, there may optionally be one or more intermediate networks 103, which operate to route communications from the client device on the client network to the service network, within which it is ultimately delivered to a single service device. An example of such a series of intermediate networks is the Internet. The same mechanism is used to route communications from a service device to a client device.

Reference is now made to FIG. 2 which illustrates a start-up sequence for a client device 105 within a client network 104. The device starts (201) in the usual manner, however at a pre-determined point (202) the device acquires a Passive Information Manager (PIM) executable. For the purposes of this document, we consider the word executable to indicate any sequence of instructions which may be executed by a machine, or by software operating on that machine. Examples include binary Windows executables for the Intel x86 architecture, Java byte-code instructions, and Microsoft Common Language Runtime (CLR) instructions.

In one embodiment, the client device may retrieve the PIM executable from its own local data-store. In an alternate embodiment, the client device may be issued instructions from a separate device on the client network 104, say as part of an authentication sequence, which causes the client device to acquire the PIM executable from a remote network device as illustrated in FIGS. 3 and 4 and which is discussed hereafter.

Once acquired the PIM executable is launched by the client device, and operates to acquire information, either from the client device itself, or from other devices on the client network, or a combination of the two, necessary for the provision of a data-processing service by the service devices 102 on the service network 101. Such information may include, but is not limited to: identity information relating to the user operating the device, such as name, groups to which that user belongs and their email address; identity information relating to the client device, such as name (e.g. under Directory Naming Service [DNS] protocol, or Simple Message Bus [SMB] protocol), address (e.g. an Internet Protocol [IP] address, or the media access control [MAC] address); or capability information relating to the client device such as versions of installed software.

Once the information has been aggregated, it is preferably encrypted, so that it may safely be communicated through several intermediate networks 103 without endangering the privacy of the client device and network. Next PIM creates a unique identifier, or UID, which uniquely identifies the device, and optionally the user operating the device. The manner of UID construction is dependent on the particular embodiment: in the simple case of a user operating a device, it may be a function applied to any one of (or any combination of) user identity information such as name and groups, device identity information, such as name and address, or other available information, such as date or time of day. The function applied to this data may include, or may be a composition of two or more of, A Hashing Function such as Message Digest versions 4 or 5 (MD4, MD5) or the Simple Hash Algorithm (SHA) versions 1 or 2, with 2 including several variants, RipeMD-160 and others.

An Encryption Function such as the Advanced Encryption Standard (AES), the Digital Encryption Standard (DES) or other encryption methods A Concatenation of several values A Portion of a value An Encoding Scheme such as Base64 and its variants.

One can see that from this that the UID will often be quite short. For example one could concatenate user name and group information, construct a 256-bit SHA-2 hash, take from that a 64-bit portion[1] and encode it using Base64, producing a 12-character textual value from a substantially larger input value. This UID and the information associated with it are transmitted to the service network, as illustrated in FIGS. 5 and 6. Next PIM alters one or more network communicators on the client device, so that every network communication issued by them (such as requests to the data-processing service) include the UID which has been generated.

[1] If we assume that SHA-2 is a perfect hash, we can assume that every bit has an equal chance of being turned on or off, and therefore a 64-bit portion of the 256-bit hash will have the same distributive properties of the full hash.

One can conclude from this that it is preferable for the UID to be as small as possible so as to minimize the overhead of embedding such a UID in every network communication. It also means that, for certain protocols, it may not be necessary to remove the UID from the original network communication to perform the data-processing service, as it may be appended to unused parts of the data-processing request. Using small UIDs has the disadvantage, however, of reducing the number of entities that can be uniquely identified. In cases where one service network provides a data-processing service to several client networks, the UID may at the service network be augmented with client-network information (e.g. network address of the client-network gateway) when persisting, and subsequently retrieving information, so a large number of concurrent clients may still be described using such a small UID.

We describe here two methods, each with two implementations, that allow network communicators to be modified to incorporate a UID.

In a first example, an embodiment assumes that the network communicator provides a controlled interface into which machine operable instructions may be injected. At certain points, the network communicator will query its data-store for such instructions, and if available, execute them. Thus by appropriately injecting instructions one can amend the behavior of a network communicator such that extra information, such as a UID, may be appended as the network communication is created. We describe two concrete implementations of such a mechanism, one for the Microsoft Internet Explorer family of web-browsers, and one for the Mozilla Firefox family of web-browsers.

Microsoft Internet Explorer provides a mechanism known as a Browser Helper Object (BHO) which encapsulates machine readable instructions which can be executed as specific points during the life-cycle of a HTTP request. Specifically, one creates an implementation of the DWebBrowserEvents2 interface provided by the Internet Explorer software developer kit (SDK), which overrides the default implementation of the BeforeNavigate2 method which has the following signature

```
void BeforeNavigate2 (
IDispatch *pDisp,
VARIANT *url,
VARIANT *Flags,
VARIANT *TargetFrameName,
VARIANT *PostData,
VARIANT *Headers,
VARIANT_BOOL *Cancel
);
```

As one can see, this provides the list of request-headers that Internet Explorer is about to send. One skilled in the art can modify this list of headers, either to add a new header with the given value, such as X-Scansafe-UID: MTIzNDU2Nzg=

Or to embed it within an existing header such as

```
User-Agent: Mozilla/5.0 (Windows; U; Windows NT 5.0; en-GB;
rv:1.9.0.11)Gecko/2009060215 Firefox/3.0.11 xss:MTIzNDU2Nzg=
```

On receipt of a HTTP network communication, the service-network can retrieve the UID by interrogating the request for the appropriate header. Where the UID is embedded within another header's value, a special code sequence (in this case "xss:") may be used to identify the point at which the UID commences. The termination position may be inferred in advance where UIDs are of a fixed size, or otherwise by use of a separate terminating code-sequence.

The creation and installation of Browser Helper Objects so configured should be clear to those skilled in the art [CodeProject 2007]. In this case the BHO operating within Internet Explorer on the client device would retrieve the UID from a data-store accessible from within the Internet Explorer process.

For Firefox, one makes use of the extension mechanism it provides. The UID, once created, is stored in the Firefox system preferences file, called prefs.js, which is located within a user-specific directory. The directory in question varies depending on the operating system: some examples for common systems are given below Windows    C:    \Documents    and    Settings\ <username>\Application Data\Mozilla \Firefox\Profiles\ <profileName>\. While it may be difficult to infer the <profileName>, in a typical installation, each user will only have one profile, and so there will only be one directory available. Where more than one profile exists, all should be amended. The path to the Application Data directory can be accessed using the Win32 SHGetFolderLocation( ) function with the CSIDL_APPDATA constant.

MacOS $HOME/Library/Application Support/Firefox/Profiles/<profileName>/ where $HOME is an environment variable defined by the system, and <profileName> is inferred as described above.

Unix $HOME/.mozilla/firefox/<profileName> where $HOME is an environment variable defined by the system, and the <profileName> is inferred as described in the previous examples. This example applies to all Unix systems, including—but not limited to—Linux, Solaris, FreeBSD, NetBSD and OpenBSD.

To add the UID, say MTIzNDU2Nzg=, to the prefs.js file is simply a matter of appending the following line:
user_pref("scansafe.pim.uid", "MTIzNDU2Nzg=");

When Firefox launches, the extension will read this value from the preferences and can either add a new value with the header, or modify existing headers, in the method described above. To acquire the value of the UID, one uses the preferences service provided by Firefox

```
var prefservice = Components.classes
    ["@mozilla.org/preferences-service;1"]
    .getService(Components.interfaces.nsIPrefService)
```

To be able to intercept every message, one must create a header modifying class. This should have an IDL description, e.g.

```
#include "nsISupports.idl"
interface ssIHeader;
[scriptable, uuid(02b56918-720b-11de-a42f-001e4f9a7063)]
interface ssIModifyHeaders : nsISupports {
    attribute unsigned long count;
    void getHeaders(out unsigned long count, [retval, array, size_is(count)] out mhIHeader headers);
    string getHeadersAsXML(in string headerIndices);
    void addHeader(in string name, in string value, in string action, in string comment, in boolean enabled);
    void setHeader(in unsigned long index, in string name, in string value, in string action, in string comment, in boolean enabled);
};
```

This in turn references a header object:

```
#include "nsISupports.idl"
[scriptable, uuid(3c121062-720b-11de-8766-001e4f9a7063)]
interface ssIHeader : nsISupports {
    attribute string name;
    attribute string value;
    boolean equals(in mhIHeader obj);
};
```

JavaScript implementations of both of these should be created, each additionally implementing the QueryInterface (NSREFIID) method, e.g.

```
function SsHeader() {
    this.aName  = ""
    this.aValue = ""
}
SsHeader.prototype = {
    get name()         { return this.aName },
    set name(name)     { this.aName = name },
    get value()        { return this.aValue },
    set value(value)   { this.aValue = value },
```

```
    get wrappedJSObject()  { return this },
    equals: function(obj) {
        this.name.toLowerCase() == obj.name.toLowerCase()
        && this.value.toLowerCase() == obj.value.toLowerCase())
        ? true : false
    },
    QueryInterface: function(iid) {
        if (!iid.equals (Components.interfaces.ssIHeader)
        && ! iid.equals(Components.interfaces.nsISupports)) {
            throw Components.results.NS_ERROR_NO_INTERFACE;
        }
        return this;
    }
}
```

For the implementation of the ssIModifyHeaders interface, the QueryInterface method will be something like the following:

```
QueryInterface: function(iid) {
    if (! iid.equals (Components.interfaces.mhIHeader)
    && ! iid.equals (Components.interfaces.nsISupports)) {
        throw Components.results.NS_ERROR_NO_INTERFACE;
    }
    return this;
}
```

With a JavaScript implementation of both the ssHeader interface and the ssIModifyHeaders interface created, the next step is to register the ssIModifyHeaders implementation (which we will hereafter refer to as the ModifyHeadersService) with the observer-service provided by Mozilla. In this example we use a third JavaScript class, a ModifyHeaders Proxy

```
function ModifyHeadersProxy() {
    this.headers = new Array()
    this.uidValue = getPref("scansafe.pim.uid");
    this.uidName = "X-Scansafe-UID"
    this.append = true;
    this.modifyheadersService =
        Components.classes[ModifyHeadersModule.serviceContractID]
        .getService(Components.interfaces.nsIModifyheaders)
}
ModifyHeadersProxy.prototype.observe = function(subject, topic, data) {
    if (topic == 'http-on-modify-request') {
        subject.QueryInterface(Components.interfaces.nsIHttpChannel)
        subject.setRequestHeader(this.uidName, this.uidValue, this.append)
    }
    else if (topic == 'app-startup') {
        if ("nsINetModuleMgr" in Components.interfaces) {
            var observerService =
                Components.classes["@mozilla.org/observer-service;1"]
                .getService(Components.interfaces.nsIObserverService);
            observerService.addObserver (
                this,
                "http-on-modify-request",
                false)
        }
    }
}
```

From this description it should be clear that by intercepting http-on-modify-request events issued by the Mozilla Firefox observer service, we can intercept outgoing requests and amend header values accordingly. Further aspects regarding implementation of these processes will be apparent to those skilled in the art [Hunt 2009, Rietta & Miller 2008].

In the preceding discussion, we discussed how a Mozilla extension, in order to append a new header to an outgoing request from the Mozilla Firefox web-browser, retrieved the UID from its preferences. This suggests a second mechanism for embedding a UID in outgoing network communications. Most communicators, regardless of purpose, will send out certain identifying information. For example the Google "spider" which trawls through the web, examining websites, identifies itself over HTTP using the standard user-agent header: User-Agent: Googlebot/2.1 (+http://www.googlebot.com/bot.html)

All BitTorrent clients, using a custom protocol, exchange protocol information in a structure which includes a variable length string. Equally, all web-browsers identify themselves, like the Googlebot, using a HTTP User-Agent header, e.g.

---

User-Agent: Mozilla/5.0 (Windows; U; Windows NT 5.0; en-GB; rv:1.9.0.11)Gecko/2009060215 Firefox/3.0.11

---

These identifying textual values are typically not embedded within the program itself, but separately, as a part of the configuration of the program. If we amend such configuration values, we can safely embed the UID within the configuration of the program. It should be noted, once again, that it is only because of the small size of the UID that we are able to perform this task.

Two examples are given. Firstly, Microsoft Internet Explorer: to amend its user-agent value we access a registry key created from the following components
1. "\\HKEY_LOCAL_MACHINE\Software\Microsoft\Windows\CurrentControlSet\Internet Settings\"
2. The version of the browser, typical examples are 4.0, 5.0, 5.5, 6.0, 7.0 and 8.0
3. "\User Agent\Post Platform"

In one embodiment the version of the browser may be determined from an exhaustive search starting at 4.0. The registry key can be altered in one of many standard methods known to those skilled in the art. To the end of the value we append the UID, say MTIzNDU2Nzg=, prefixed by a special code sequence such as xss: to indicate the start of the UID. Thus in the case of Internet Explorer, the user agent could change from
Mozilla/4.0 (compatible; MSIE 7.0; Windows NT 6.0)
to
Mozilla/4.0 (compatible; MSIE 7.0; Windows NT 6.0) xss:MTIzNDU2Nzg=

A second example is Mozilla Firefox. As we noted earlier, Mozilla Firefox's settings are stored in a file called prefs.js in a particular directory, the path to which will vary depending on the platform. One particular preference in that file is an addendum to the value of the user-agent string. Therefore one simply has to add the following entry to the end of the preferences file.
user_pref("general.useragent.extra.xs", "xss:MTIzNDU2Nzg=");

Other embodiments may seek to disguise this addition by adding the line not to prefs.js, but rather to the user.js file in the same directory, which Mozilla Firefox executes on start-up. With a suitable security policy, end-users may be unable to change this file.

Thus embodiments may alter a network communicator by means of an extension mechanism executing machine instructions at pre-determined points, or by means of configuration changes, both of which methods may be applied to the Microsoft Internet Explorer and Mozilla Firefox families of web-browsers.

Reference is now made to FIG. 3, a block diagram which shows the launch of the PIM executable in one potential embodiment. Shown in the diagram are the client device 105, a client operator or user 317, and a client accreditation device 301 which authenticates would-be operators, authorizing them to operate the client device. All of these are members of the client network 104. Separate from this network, is the service network 101, which contains several service devices (102) and optionally a load-balancing gateway device (not shown). Between the client and service networks are optionally several intermediate networks 103 through which network communications are routed.

In this embodiment, upon start-up, the client device 105 presents the user 317 with an authentication challenge 301. The user presents their credentials to the client device (302), which may then optionally consult with another device on the client network to authenticate the user's credentials (steps 303 and 304). Upon authentication a predefined set of machine operable instructions are executed (307). Such instructions may be acquired from the client accreditation device 301 (steps 305-306), or from a local data-storage medium. Such instructions may operate to acquire the PIM executable, which may again be acquired from the client accreditation device (steps 308-309) or from the client device's data-store. Once acquired, execution of the PIM executable commences.

An obvious example of this process is the login process provided by operating systems such as the Windows family of operating systems, used in conjunction with a network authentication service such as Active Directory. A less obvious example is a network gateway, which precludes access to external networks such as the Internet until the user is authenticated: in such an example a user may attempt to visit a website via their web-browser, at which point the web-browser may instead download PIM, or else present an authentication dialog, and on authentication, download PIM. In this example the PIM "executable" may be an ActiveX object or a Java applet.

The PIM is launched (311) and the first step PIM performs on execution is to gather the information necessary (312) for the provision of the data-processing service. The nature of this data acquisition has already been described with reference to FIG. 2 depending on the particular embodiment: the information may be acquired from a data-store on the client device, or from other devices (such as the client accreditation device 301) on the client network 104. Next PIM calculates a UID (312), using similarly accessible information, in the manner described heretofore. Once the UID and information are calculated a network communication is issued to the service network (313), seeking to propagate the UID and information (314). In a preferred embodiment, the UID and information are concatenated using, for example, the ZIP method, then encrypted using a symmetric cipher such as AES using a block scheme such as Cipher Block Chaining. The key for the symmetric cipher is generated using a secure random number generated, then encrypted using an asymmetric cipher such as Rivest, Shamir & Adleman (RSA) algorithm using a public key published by the service-provider. The encrypted key and encrypted data are sent using the hyper-text transfer protocol (HTTP) to a particular device on the service network. Upon receipt of network communication 313, a particular device will extract the UID and information, store the information in a local data-store, and propagate the UID and information to all other service devices (314). In the embodiment outlined above, the step of extracting the UID and information involves using the service-network's private key to decrypt the key, and using the key to decrypt the UID and information.

As an alternative the UID and information they may be sent in a single HTTPS (HTTP secured) request, where the steps of encrypting and securing the communication channel between client and service devices is achieved by means of the underlying protocol.

Once the service device has received the network communication 313, processed it, and initiated the propagation step 314, it optionally issues a network communication 315 to PIM indicating that the propagation step succeed. PIM now modifies network communicators on the client device (316), either by means of a configuration change, or by injecting machine-operable instructions as described earlier. At this point, network communicators so modified can begin to issue requests to the service (319). On receipt of such a communication, the service device operates to handle (318) the request in the following manner:

1. Extract the UID from the communication. The manner of extraction depends on how the UID was embedded within the communication. In one embodiment, the communication protocol is HTTP, the network communicator a web-browser, the UID embedded by means of modifying a header, the header being the User-Agent header, the UID identified within that header by means of a prefix such as "xss:", the end of the UID being identified by white-space, end-of-line or end-of-file characters.
2. Use the UID to retrieve the client information previously persisted in a data-stored indexed by UIDs.
3. Perform the service requested by the communication. In one embodiment the service is a web-filtering service, the request is a HTTP request for a item of web-content (albeit augmented with an embedded UID), the additional information retrieved using the UID identifies the user, the service operates to ensure that the request, or the content of the requested resource, does not contravene usage-policies which apply to that user, the service responding with the web-content, or with a page stating that such content may not be accessed. To perform such a service, in the context of the embodiment here described, it may be necessary to remove the UID from the request, and use this modified request to fetch the web-content.

All subsequent requests will operate in the same manner. Note that in other embodiments, the client device 105, the network communicator on that device, and the service devices (102) on the service network 101 may operate to ensure that information changed on the service network once uploaded is also persisted within the client network 104.

Service devices may find it prudent to employ an eviction strategy which removes UIDs and associated information, to conserve system resources. Such strategies may include removing the least used entry in a list of bounded length on the addition of a new entry or removing entries whose age is greater than a certain limit. Upon eviction, the service device will not be able to service client requests with that UID, and clients must re-launch PIM (potentially by restarting the client-device) to once more persist UID and associated information.

Reference is now made to FIG. 4 which is a block diagram describing a specific embodiment of the current invention, with unique characteristics. This embodiment involves the propagation of user-identity information in cases where identity information is available via a single sign-on mechanism. In a single sign-on system, a user provides his credentials only once, and these are then used to authorize access to various different services. One common method involves a Kerberos server: the user logs in, in the normal fashion, and is provided a ticket-granting ticket (TGT), When the user tries to access a service, they present the ticket to the service provider (SP), which contacts the Kerberos identity server for a service-ticket. The service provider then uses this service ticket to determine the level of access to which the user is entitled. In this case the Kerberos server is a producer of identity information, known in the art as an Identity Provider (IdP).

When applied to HTTP based services all hosted within a local network (e.g. an intranet) a user can log into any one service, via their web-browser or other HTTP user-agent, and the service will assign a cookie containing identity information about the user. As the services are all hosted in the same client-network intranet, all will exist on the same domain, and therefore the user's web-browser (or any other network communicator operating over the HTTP protocol) will supply the same identity information, via the cookie, to all services who use it to determine the user's level of access.

Where problems arise however, is when the services are not all on the same network. As mentioned in the background to this patent, data-processing services have in recent years moved out of local networks and into "the cloud"—i.e. they are hosted on remote networks, accessible from the local network, typically via the Internet. As different services in such an arrangement exist on different domains, cookies may no longer be used to persist and present user-identity information. One approach to the Web-Browser Single Sign-On problem is the Security Assertion Markup Language (SAML) [Bertino2004] and its associated protocols and profiles. A simple web-based single sign-on solution is illustrated in FIG. 7. In the first step, the network communicator, which in this case is a HTTP user-agent such as a web-browser, requests a resource (704) from the service provider 701. As no cookie exists in the HTTP request, the service provider 701 sends back a HTML form (705) containing a SAML request for authentication, such as the following

```
<form method="post"
action="https://idp.example.org/SAML2/SSO/POST" ...>
<input type="hidden" name="SAMLRequest" value="request" />
...
<input type="submit" value="Submit" />
</form>
```

The value of the SAMLRequest input is the base64 encoding of the <samlp:AuthnRequest> element. In some embodiments, the returned HTML may use JavaScript to automatically submit the form, without requiring the user's intervention. The form is submitted (706) to an identity provision server (IdP, 703 in the diagram). At this point the identity provision server may not have prior knowledge of the user, i.e. they may not as yet have signed on for their one and only time. If this is the case, the IdP server may present the user, via their user agent, with a login form, which they complete and submit as illustrated in step 707. Once the IdP server 703 has knowledge of the user's identity, and so can construct a response, the response is sent in a HTML form, with the response, a <samlp:Response> element, encoded using base64 and embedded in the SAMLResponse input.

```
<form method="post"
action="https://sp.example.com/SAML2/SSO/POST" ...>
<input type="hidden" name="SAMLResponse" value="response" />
...
```

-continued

```
<input type="submit" value="Submit" />
</form>
```

As with the request for authentication, the response HTML may make use of JavaScript to automatically submit the form (709) to the service provider 701. Assuming the service-provider 701 accepts the credentials so provided, and grants access to the resource, the service provider 701 will issue a HTML page (710) to the user-agent, instructing it (via a redirect in HTML or JavaScript) to download the original resource (step 711) just as in step 704. In issuing the redirect page (710) it will also store an authentication cookie in the user-agent 702, so that the repeated request for the resource, step 711, will now succeed, and return the resource as requested (712). All subsequent requests will equally succeed. It should be noted that the service provider, user-agent, and identity provider could in certain embodiments all exist on separate networks. For the purposes of brevity, we do not explain the SAML protocol in depth in this description, as such information is readily available, and should be known to those skilled in the art [Bertino2004].

The novel feature addressed by this aspect of the present invention concerns the case of a data-processing service which is HTTP aware, but which for various reasons cannot store cookies. Typically such data-processing services are intermediaries in HTTP communications, such as, but not limited to, proxies, firewalls and web-filtering services. To use a web-based single sign-on scheme, which relies on HTTP, either directly via POST and/or GET requests, or indirectly, via SOAP requests, and still persist the authentication credentials requires the UID generation, communicator-amendment and data propagation methods outlined earlier. Such a scheme is illustrated in FIG. 4 and is explained herein with reference to that illustration.

As the client device 105 is started, it acquires and launches the PIM program (310) in the usual manner, and as before, it collects data (311) with which to generate a UID (312). Unlike the previous embodiment, illustrated in FIG. 3, data is collected only to generate a UID, no other data is collected. PIM immediately alters the network communicator (316) so that the UID is embedded in every request using one or more of the methods outlined above.

At the first request (319) issued by the network communicator in question, which in this embodiment is a HTTP user-agent, the selected service device (102) will attempt to retrieve associated user-identity information, fail, and then ask an SP device (402) for such information. This SP device 402 will then begin the SAML-based authentication mechanism. First, it needs to identify the IdP server's address. In one embodiment, the address of the client device is supplied with the network communication, the network is identified from this address, and the address of the IdP server is identified by querying a data-store accessible by the SP server 402 and indexed by network. The SP server 402, via a HTML page and a redirect in the network communicator, issues a SAML authentication request (404) to the IdP server (401). If the user has not yet signed in, the IdP server will issue an authentication request (406) to the client device (105). Given that this is over HTTP, a simple example would be a web-page with a login-form. Once submitted by the user (407), and verified (408, 409) with the client accreditation device (301), the user's authentication details may be sent to the SP server (402). Note that in some embodiments the client accreditation device (301) and the IdP device (401) may actually be the same physical device providing two functionalities. Note also that in some embodiments the PIM program may not be run when the client is started, but instead may be delivered and run as part of the IdP authentication request, for example as an ActiveX program within the web-page containing the login-form.

The SAML response is sent (410) to the SP device (402). Again, as with the SAML request (404), the response is sent via a user-agent on the client device, which acts to forward the SAML response onto the SP device. The SP device then acts to extract the user identity information, and supply this information with the UID (411) to the service device 102, which stores it in a computer readable storage medium, and then propagates UID and information (314) amongst all other service-devices using methods described below. The service-device is now ready to perform the request, but as the client device may have been used as an intermediary in other communications (404, 410), and as HTTP is essentially stateless, to complete the request the service device 102 will send a redirect response[2] to the client device, asking it to replay the original request. Upon receipt, the service-device can perform the data-processing service requested, using the UID embedded in the network communication to access the user-identity information persisted to its data-stored, indexed by UIDs. Thus web-based single sign-on schemes can be integrated unobtrusively with HTTP based data-processing services such as proxies, firewalls and other web-filtering software.

[2]There are three ways to send redirect response using HTTP. The first is to send a HTTP response with the new URL in the Location: header and the status code set to 302. The second is to send a HTML page making use of the the <meta> tag in the format <meta http-equiv="refresh" content="3; URL=http://www.site.com> where this instructs the user to redirect to www.site.com after 3 seconds. The third is to use JavaScript to set the value of the location field, e.g. <script>window.location.href=http://www.site.corn</script>. A fourth approach is to use a combination of two or more of the above.

Reference is now made to FIG. 6 which describes the simplest possible propagation strategy for a network 101 of service devices (102). In the simple case, upon start-up, every service device makes itself known (step 601) to a central, messaging hub 605. This may be a separate device, or it may be one of the service devices 102 which is configured to additionally act as a hub. Upon receipt of a propagation request 314, the hub will issue a "store" message (602) to all registered service devices, instructing them to store the given information with the given UID in their local data-store. Details of the transfer mechanism will vary depending on the embodiment, but several messaging systems should be already familiar to those skilled in the art.

In a variation of this method, service-providers do not make themselves known to the hub at start-up, instead the hub issues multicast messages at regular intervals, to which service-devices respond, identifying themselves. This allows the hub to detect if a service device is no longer online.

This method has several flaws however. In the first instance, much manual configuration is required: every service-device 102 needs to have the address of the hub device 605 provided to it. Should the hub change address, all service-devices will need to be changed. In the second instance, the system is entirely reliant on a single hub-device: if the device fails, the entire messaging system will fail. Both of these flaws speak to the need for a more reliable, self-organizing messaging system.

Reference is therefore made to FIG. 5, which describes a self-organizing, peer-to-peer system and method for the propagation of data, such as UID and associated information, across a network (101) of service-devices (102). In a peer to peer system, every service-device may optionally act as a hub, using a discovery protocol to identify nearby service-devices. In one embodiment, where the service network uses the ethernet protocol, a multicast signal could be emitted by one service device (102) over a particular port on start-up so that all other devices, listening to that port, would thus become aware of the device, and add it to their device catalog. On receipt of an incoming UID and associated information (316) the device would act to re-transmit that UID and information to all devices in its catalog (501). These devices would likewise act to re-transmit data. In order to prevent circular loops, devices should only transmit data when either no information exists in its storage-medium associated with the given UID, or the information stored with the given UID differs from that received. Some embodiments, for the purposes of expediting comparisons between blocks of information, may augment such blocks with hashes of the information which can be easily and rapidly compared. While this method adds many redundant re-broadcasts, it also ensures the network can survive failures of individual nodes.

Such a peer-to-peer method presumes that all service-devices are located on a single network. However, assuming a load balancer exists on the service network, and can access other networks, it is possible the server devices may be located over several networks. This immediately poses difficulties with the scheme outlined above, as service-devices may not be aware of other service networks, and multicast communications will not reach those other networks. A method to provide for peer-to-peer communication over several networks is to implement a virtual overlay-network, taking advantage of application and transport layer protocols in the underlying, real, networks to route communications within and between them. Many methods exist that do this, which are known to those skilled in the art. For the purposes of illustration, we briefly describe one common method for implementing such a network: the JXTA protocol family [Brookshier2002].

JXTA is a protocol defining a peer-to-peer network, for which Java, C, C++ and other implementations exist. It defines several types of network nodes, called peers, and several protocols. Unlike traditional networking where a node refers to a specific physical device, in JXTA, one device may have many peers associated with it, each providing a different service.

Peers are gathered together into groups. Groups provide two capabilities: firstly they allow for a load balancing strategy to be implemented, with different peers in the same group providing the same service to different clients. Secondly, peer groups can provide a degree of privacy, by restricting messaging to the local group, in the same way a Virtual Private Network allows communication within the virtual network, which is inaccessible to devices outside the network. Entry to groups may be controlled by any authentication and authorization scheme, the simplest being a password based scheme.

As JXTA overlays a virtual network over existing physical networks, it must provide its own addressing, transport and routing mechanisms. Therefore each peer has its own unique ID, typically generated as some function of the client's pre-existing identity information and information identifying the service. This ID is combined with an underlying protocol to create an endpoint. Each peer may have several endpoints depending on how many protocols it supports: for example a peer with one ID may be accessible via TCP or HTTP and will thus have two end-points. The former is of use for local network access, the later for inter-network (e.g. Internet) access.

JXTA creates its own connections between peers, which are called pipes, and data is transmitted across these pipes. A single pipe can span several networks, being relayed by several individual devices, so a single pipe may correspond to several real connections in the underlying networks. A pipe may therefore be thought of as a virtual connection, with a peer being a virtual device with several endpoint addresses. There are several different kinds of pipe Asynchronous Unidirectional: This issues messages to other peers, does not wait for any response or notification of receipt, and does not guarantee that messages arrive in the order they were issued Synchronous Unidirectional: This issues messages to other peers, does not wait for any response or notification of receipt, but guarantees that messages arrive in the order they were issued Synchronous Request/Response: This issues messages to other peers, waits for a response, and guarantees messages arrive in the order they were issued Asynchronous Bidirectional: A combination of two asynchronous unidirectional pipes, this allows two way communication between peers, but does not guarantee the messages are received in the order they were issued.

Bulk Transfer: Such pipes are used to transmit large amounts of data, and therefore seek to take advantage of any special facilities the underlying network may offer Streaming: Such pipes are used to stream large amounts of content, such as audio or video, and therefore seek to take advantage of any special facilities the underlying network may offer Unicast: This issues messages to all peers, waits for acknowledgment, optionally supports encryption, but is not synchronous.

As should be readily apparent, pipe addressing may be from one peer to another (point-to-point), or from one peer to many (propagate).

Next we identify the types of peers on the network

Standard Peer: A standard, ordinary node on the network, receiving requests for a particular service, and optionally issuing responses, depending on the type of pipe delivering the communication Rendezvous Peer: This provides information about the constituent peers of the local network. Rendezvous peers may delegate to other rendezvous peers if they themselves fail to find the desired peer: these other rendezvous peers may be on different physical networks. For example, in one embodiment, on receipt of a service-search request, a rendezvous peer may use a unicast pipe to query all peers in its neighborhood, and either return the endpoint of a suitable peer providing the service if found, or else relay the search to the next rendezvous peer if not found. Rendezvous peers are analogous to seeds as described in other P2P networks.

Gateway Peer: This acts as a bridge between networks, forwarding requests from one peer to another (note that the pipe concept abstracts away underlying gateway peers). Gateway peers may change the underlying protocol as the message crosses network boundaries, e.g. they may accept a TCP connection from the local network, but use a HTTP connection to tunnel through the network firewall to the next network. Note that whereas rendezvous peers relay search-requests, gateway peers relay messages. Note also that Gateway peers may change the underlying protocol even for communications within networks if the destination endpoint does not support the incoming protocol.

Router Peer: This creates a route between endpoints through which a pipe may pass, potentially involving several gateway peers. Router peers can work around failures within the network (e.g. hardware failures). They are an abstraction of the standard router concept.

Relay Peer: This is not a peer defined by the standard. It is a term used to refer to a device which acts as rendezvous, gateway and router peers, due to the commonality in these peers' functions.

The types of communication between peers are defined by six JXTA protocols, described below. The protocols are:

Peer Discovery: Resource Search. This can be used to scan the XML, advertisements issued by peers, identifying their name and the services they provide, to identify which peer provides a desired service.

Peer Resolver: Generic Query Service. This takes a peer endpoint and a description of the desired service, and returns the peer's response. This can be used in a unicast manner as well, to find the first peer that provides the given service.

Peer Information: Monitoring. This returns basic status information on a particular peer.

Peer Membership: Security and Access Control. This allows a peer to join or leave a group. Before joining a peer may have to supply certain credentials, which are authenticated before membership is granted. Grouping peers in this manner allows for private communication across networks, similar to a Virtual Private Network (VPN)

Peer Endpoint: Routing. This allows a peer to construct a route to another peer endpoint Peer Binding: Addressable Messaging. This physically binds the route created using the endpoint protocol. The combination of endpoint and binding protocols is analogous to the route construction aspect of the Transport Control Protocol (TCP)

Rendezvous: Propagation messaging. This is used to propagate messages within peer groups.

It should become apparent that many peer types and protocols are simply abstractions over existing network concepts, used when constructing the virtual network overlay. For each of the protocols, there are one or more services which one or more peers will provide in order to ensure the good working of the network, in addition to the domain specific services provided to implement the networked application.

Therefore, to securely propagate data within a networks, one defines a subset of the service devices as relay peers, and all devices are standard peers (recall that one device may host more than one peer). The peer devices issue advertisements identifying themselves by name, and advertising their ability to receive and store UIDs with associated information. Upon receipt of a UID/information pair from the client network (104) a service-device (102) will use the rendezvous protocol to propagate that message as a service request (e.g. using a unicast pipe) to all peers on the local network, and via gateway peers, to all peers on other networks. The presence of multiple rendezvous peers means that one can route around network failures, and in some implementations peers may provide a rendezvous service automatically. Thus such an embodiment of the current invention could robustly propagate Urns with associated information throughout the service network. Used in conjunction with a single sign-on system, it provides a robust, distributed, data-processing service, with a particular aptitude to web-filtering.

With that said, while the invention has been described with reference to specific exemplary embodiments in the foregoing specification, it should be evident that various modifications and changes may be made to such specific exemplary embodiments without departing from the broader spirit and scope of the invention as set forth in the appended claims. Accordingly, the specification and drawings are to be regarded in an illustrative rather than a restrictive sense.

REFERENCES

1. Gartner says security delivered as a cloud-based service will more than triple in many segments by 2013. Press Release, July 2008. Available from World Wide Web: http://www.gartner.com/it/page.jsp?id=722307.
2. Elisa Bertino, Lorenzo Martinoand Federica Paci, and Anna Squicciarini. Securing Web Services with WS-Security: Demystifying WS-Security, WS-Policy, SAML, XML Signature, and XML Encryption. Sams Publishing, May 2004.
3. Daniel Brookshier, Darren Govoni, Navaneeth Krishnan, and Juan Carlos Soto. JXTA: Java P2P Programming. Sams Publishing, April 2002.
4. John Edwards. U.S. patent application Ser. No. 11/534, 604: Network Communications. Available from World Wide Web: http://www.patentstorm.us/applications/20070074018.
5. Brian Hayes. Cloud computing. Communications of the ACM, 51(7):9#11, Jul. 2008. Available from World Wide Web: http://portal.acm.org/citation.cfm?id=1364786.
6. Graham Hunt. Modify headers overview. Website, April 2009. Available from World Wide Web: http://modifyheaders.mozdev.org/.
7. Jia. C. How to attach to Browser Helper Object (BHO) with C-Sharp in
8. two minutes. Website, August 2007. Available from World Wide Web: http://www.codeproject.com/KB/cs/Attach_BHO_with_C_.aspx.
9. Frank Rietta and Ben Miller. Firefox extension development tutorial. Website, 2009. Available from World Wide Web: http://www.rietta.com/firefox/Tutorial/overview.html.

What is claimed is:

1. A method for the provision of a network service, the method being implemented using:
   (a) a network processing service comprising:
      i. a service network comprising one or more service devices, each of which can provide a service over a network,
      ii. a client network comprising one or more client devices, one or more of which is a client of the service network, and
   (b) information available to the client network, but not the service network, which is necessary for the functioning of the network processing service provided by the service devices of the service network,
   wherein a client device comprising a data propagation agent acts to:
      i. retrieve the information from the client network necessary for the service network to fulfill a request from the client network,
      ii. create a UID, which uniquely identifies the client device on the client network,
      iii. aggregate UID and associated information into a key-value bundle, and issue said bundle to the service network,
      iv. amend one or more network communication agents on the client device such that every network communication issued by the network communication agent contains the UID, and wherein the service device:
- v. on receipt of a new key-value bundle, acts to store the key-value bundle in a local data-store, and propagate that key-value bundle to all other service devices on the service network, and
- vi. on receipt of a network communication from the network communication agent located on a client device acts to:
  - A. extract the UID from the request issued by the network communication agent,
  - B. interrogate the data-store for information associated with the UID, such information being essential to the provision of the network processing service, and
  - C. perform the requested service described in the network communication and issue a network communication in turn to the client device with a response that corresponds with the requested service.

2. The method of claim 1, including an external network linking the service network and client network, through which a client device of the client network issues a network communication to any of the devices on the service network, and to which a single processing device of the service network responds by issuing a network communication in turn.

3. The method of claim 1 wherein on receipt of a key-value bundle, the service device augments the key with further information contained within the request, which may optionally include the network address of a gateway device on the client network, such augmented key being used for the persistence and retrieval of associated data, and optionally its propagation.

4. The method of claim 1 wherein the UID is derived from one or more data of:
   (a) a Media Access Control (MAC) address of the network adapter on the client network device,
   (b) any Internet Protocol (IP) address assigned to the client network device,
   (c) an identifier of a user who is currently controlling the client device, the identifier optionally comprising one or more of:
      i. a username assigned to the user
      ii. a password assigned to the user
      iii. names of one or more groups assigned to the user.

5. The method of claim 4 wherein the derivation of the UID from data is carried out by functions of the data, used alone or in conjunction, optionally including, but not limited to, one or more of:
   (a) a subset of the data,
   (b) a concatenation of the data,
   (c) an encrypted concatenation of the data, using a symmetric cipher, such as Blowfish, the Digital Encryption Standard (DES), the Advanced Encryption Standard (ABS) and Twofish,
   (d) an encrypted concatenation of the data, using an asymmetric ("public-private-key") cipher using a public key available to the client device, such as Rivest, Shamir, Adleman (RSA) algorithm,
   (e) a selection of the bits emitted by a hash function applied to a concatenation of the data, such a hash function including Message Digest 4 (MD4), Message Digest 5 (MD5), Secure Hashing Algorithm 1 (SHA-1), Secure Hashing Algorithm 256 (SHA-256), Secure Hashing Algorithm 384 (SHA-384), Secure Hashing Algorithm 512 (SHA-512), Whirlpool and Tiger.

6. The method of claim 1 wherein the network processing operates over the HTTP protocol.

7. The method of claim 1 wherein the UID is embedded in a new header in a standard network communication from the network communicator.

8. The method of claim 1 wherein the UID is appended to the existing value of a standard header in a standard network communication from the network communicator.

9. The method of claim 7 wherein the network communicator is a Microsoft Internet Explorer and is instructed to incorporate the UID in a new header by using the BeforeNavigate2( ) event handler to add a new header to the request, the BeforeNavigate2( ) event handler being a part of the DWebBrowserEvents2 interface, the resulting code being integrated with Internet explorer by way of a Browser Helper Object.

10. The method of claim 8 wherein the network communicator IS a Microsoft Internet Explorer and is instructed to incorporate the UID into an existing header's value by using the BeforeNavigate2( ) event handler to modify a header within the request, the BeforeNavigate2( ) event handler being a part of the DWebBrowserEvents2 interface, the resulting code being integrated with Internet explorer by way of a Browser Helper Object.

11. The method of claim 7 wherein the network communicator is Mozilla Firefox and is instructed to incorporate the UID in a new header by using the Mozilla observer service to intercept http-on-modify-request events, the intercept is used to interrogate the state of the request to extract the header structure, and the header structure is amended to incorporate the UID in a new header.

12. The method of claim 8 wherein the network communicator is Mozilla Firefox and is instructed to incorporate the UID into the value of an existing header by using the Mozilla observer service to intercept http-on-modify-request events, the intercept is used to interrogate the state of the request to extract the header structure, and the header structure is amended to incorporate the UID in an existing header's value.

13. The method of claim 8 where the network communicator is Internet Explorer, the header is "User-Agent" and the method of incorporating the UID in the "User-Agent" header consists of:
   (a) changing the value of the standard "User-Agent" header as stored as an element of the configuration of the "Trident" browser component which underpins Internet Explorer and other software applications that incorporate the browser component,
   (b) the configuration being stored within the Microsoft Windows registry,
   (c) the name of the configuration element being the concatenation of:
      i. "\\HKEYLOCALMACHINE\Software\Microsoft\, Windows\CurrentControl Set\Internet Settings\",
      ii. the version of the browser component, and
      iii. "\User Agent\Post Platform",
   (d) the value of the "User-Agent" header optionally consisting of zero or more of the following:
      i. an Engine-Compatibility Identifier and Version, delimited by a forward slash,
      ii. a Platform Identifier in parenthesis, the platform identifier consisting of details of platform components delimited by semi-colons,
      iii. a Browser Engine Identifier and Version, delimited by a forward slash,
   (e) a value consisting of the UID and a particular prefix that identifies the start of the value,
   (f) the value being inserted within the platform identifier field.

14. The method of claim 8 where the network communicator is the Mozilla Gecko-based web-browser such as Mozilla Firefox, the header is "User-Agent" and the method of incorporating the UID in the "User-Agent" header consists of:
   (a) changing the value of the standard "User-Agent" header as stored as an element of the configuration of the "Gecko" browser component which underpins Mozilla Firefox and other software applications that incorporate the browser component,
   (b) the configuration being stored within a text file on the file-system called which is accessible by the web-browser employing that component and accessed by it on start-up,
   (c) the value of a typical "User-Agent" header optionally consisting of zero or more of the following:
      i. an Engine-Compatibility Identifier and Version, delimited by a forward slash,
      ii. a Platform Identifier in parenthesis, the platform identifier consisting of details of platform components delimited by semi-colons,
      iii. a Browser Engine Identifier and Version, delimited by a forward slash,
   (d) a value consisting of the UID and a particular prefix that identifies the start of the value,
   (e) a new user-agent header value in the format in (c) which describes the web-browser, but contains the value created in step (d) within the platform identifier,
   (f) adding a user_pref( ) function call to the file in (b) which amends the user-agent either by:
      i. assigning a value for the User-Agent with the key "general.useragent.override" and the value of the new user-agent as created in step (e), or
      ii. assigning an addendum to be appended to the standard User-Agent with the key "general.useragent.extra.XXX" and the value of the UID with prefix created in step (d), where any text may be substituted for the sub-string XXX in the key.

15. The method of claim 1 wherein the data propagation agent is passed the necessary information to create a UID as it is started via a command-line parameter.

16. The method of claim 1 wherein the data propagation agent queries a client device to retrieve the necessary information to create a UID.

17. The method of claim 16 wherein the client device queried is a computer on which is running a Lightweight Directory Access Protocol (LDAP) Server which can be queried using the LDAP protocol to retrieve data optionally including but not limited to user name, password, email, organization name, and country.

18. The method of claim 16 wherein the client device queried is a computer on which is running a Microsoft Active Directory Server which can be queried using the active directory protocol to retrieve data optionally including but not limited to user name, password, email, organization name, and country.

19. The method of claim 16 where the device queried is a computer on which is running a Microsoft Windows Primary Domain controller, a Samba server, or any server software accepting requests using the Server Message Block (SMB) protocol which can be queried using the protocol to retrieve data optionally including but not limited to user name, password, email, organization name, and country.

20. The method of claim 1 where the data propagation agent initiates a single sign-on (SSO) request over HTTP in conjunction with a service device on the service network to retrieve information to be associated with a UID and issued to a service device on the server network for propagation, the information including but not limited to the user's name and password, the process consisting of:
   (a) a service device providing a service on the service network,
   (b) a service provision (SP) server accepting network communications containing requests formatted using the Security Assertion Markup Language (SAML) on the service network,
   (c) an identity provision (IdP) server accepting network communications containing requests formatted using SAML on the client network,
   (d) a service device on the service network receiving a network communication with a UID, and failing to retrieve associated value, the service device then operating to retrieve this data, the retrieval process consisting of:
      i. the service device issuing a network communication to the client device from which the request originated, specifying that the client device should request identification from the SP server,
      ii. the SP server operating to create a SAML assertion, thence issuing a network communication to the client device instructing the client device to present the constructed SAML assertion to the IdP server
      iii. the IdP server retrieving the SAML assertion, and acting to retrieve the identity,
      iv. the IdP server optionally:
         A. issuing a network communication to the client device, instructing the client device to issue a request for authentication to the IdP server with the SAML assertion, and
         B. the IdP server operating to retrieve the user details,
      v. the IdP server operating to construct a SAML assertion with the user details retrieved from steps (iii) and (iv), and
      vi. the IdP server issuing a network communication to the client device with the SAML assertion constructed in (v), the response instructing the client device to present the retrieved details with UID to a service device for propagation.

21. The method of claim 1, wherein the service device, on receipt of a key-value bundle, operates to propagate that data using a peer to peer technology consisting of:
   (a) a network of service devices providing a service,
   (b) each service device being aware of zero or more service devices providing an identical service on the network, hereafter referred to as peers,
   (c) one said service device, hereafter referred to as the seed, receiving a key value bundle and operating to:
      i. store the value with the associated key in a data-store
      ii. optionally issue a network message to all known peers on the service network, the network message consisting of at least:
         A. the key,
         B. the associated data, and
         C. optionally time-to-live information, enumerating the number of transmissions the data has carried from the initial receipt of the request within the service network, and
      iii. all other service devices in the service network, on receipt of the message, optionally proceeding to operate as described in steps (i) and (ii).

22. The method of claim 2 wherein the external network is an internet-level network.

23. The method of claim 22 wherein the internet-level network is the Internet operating with Internet Protocol (IP) version 4.

24. The method of claim 22 wherein the internet-level network IS the Internet operating f with Internet Protocol (IP) version 6.

25. The method of claim 1, wherein a device on the service network operates to process a network communication, the processing optionally depending on data retrieved from a data-store, the data identified by the UID, and the UID being embedded in the network communication.

26. The method of claim 1 wherein the data propagated by the data propagation agent is first encrypted.

27. The method of claim 1 wherein the UID is encrypted.

28. The method of claim 27 wherein the UID is decrypted before it is used to retrieve associated data.

29. The method of claim 1 wherein the data associated with a UID is encrypted before transmission.

30. The method of claim 29 wherein a service device on the service network operates to decrypt data associated with a key, the data having been previously encrypted.

31. The method of claim 21 wherein a service device on the service network operates to decrypt data associated with a key, the data having been previously encrypted data, and the decrypted data is again encrypted when propagated.

32. The method of claim 1, wherein the additional information associated with a UID comprises local network information.

33. The method of claim 1, wherein the additional information associated with a UID comprises anyone or more of a user's user ID, group membership, phone number, location, address and other information obtained from a local network directory or directories.

34. The method of claim 1, wherein the additional information associated with a UID comprises other data associated with the network communication, derived data associated with the network communication, and/or other information independent of the specific network communication.

35. The method of claim 1 wherein, on a failure by the service device to retrieve the UID or to retrieve the associated data, the service device operates to issue a network communication to the client device notifying the client device of a data discovery failure.

36. A system for providing a network service, the system comprising:
   (a) a network processing service that comprises:
      i. a service network comprising one or more service devices, each of which can provide a service over a network,
      ii. a client network comprising one or more client devices, one or more of which is a client of the service network, and
   (b) information available to the client network, but not available to the service network, which is necessary for the functioning of the network processing service provided by the service devices of the service network,
   wherein a client device comprises a data propagation agent that operates to:
      i. retrieve the information from the client network necessary for the service network to fulfill a request from the client network,
      ii. create a UID, which uniquely identifies the client device on the client network
      iii. aggregate the UID and associated information into a key-value bundle and issue said bundle to the service network,
      iv. amend one or more network communication agents on the client device such that every network communication issued by the network communication agent contains the UID, and
   wherein the service device operates:
      v. on receipt of a new key-value bundle, to store the key-value bundle in its a local data-store, and propagate that key-value bundle to all other service devices on the service network, and
      vi. on receipt of a network communication from the network communication agent located on a client device, to:
         A. extract the UID from the request issued by the network communication agent,
         B. interrogate the data-store for information associated with the UID, such information being essential to the provision of the network processing service, and
         C. perform the requested service described in the network communication and issue a network communication in turn to the client device with a response that corresponds with the requested service.

37. A system according to claim 36, including an external network linking the service network and client network, through which a client device of the client network issues a network communication to any of the devices on the service network, and to which a single processing device of the service network responds by issuing a network communication in turn.

38. A system according to claim 37, wherein the external network is an internet-level network.

39. A method of providing a network service using a service network comprising one or more service devices, and a client network comprising one or more client devices, the method comprising:
   (a) a client device:
      i. retrieving from the client network information necessary for the service network to fulfill a request from the client network, said information being available to the client network but not the service network, and necessary for the functioning of a network processing service provided by a service device of the service network,
      ii. creating a UID that uniquely identifies the client device on the client network,
      iii. aggregating the UID and associated information into a key-value bundle, and issuing said bundle to the service network,
      iv. amending one or more network communication agents on the client device such that every network communication issued by the network communication agent contains the UID, and
   (b) the service device:
      i. on receipt of a new key-value bundle, acting to store the key-value bundle in a local data-store, and propagating that key-value bundle to all other service devices on the service network, and
      ii. on receipt of a network communication from the network communication agent located on a client device:
         A. extracting the UID from the request issued by the network communication agent,
         B. interrogating the local data-store for information associated with that UID, such information being essential to the provision of the network processing service, and C. performing the requested service described in the network communication and issuing a network communication in turn to the client device with a response that corresponds with the requested service.

40. A system for providing a network service, the system comprising:
(a) a service network comprising one or more service devices, each of which can provide a service over a network, and
(b) a client network comprising one or more client devices, one or more of which is a client of the service network, wherein at least one said client device comprises a data propagation agent that operates to:
   i. retrieve the information from the client network necessary for the service network to fulfill a request from the client network, said information being available to the client network, but not available to the service network, which is necessary for the functioning of the network processing service provided by the service devices of the service network,
   ii. create a UID, which uniquely identifies the client device on the client network
   iii. aggregate the UID and associated information into a key-value bundle and issue said bundle to the service network,
   iv. amend one or more network communication agents on the client device such that every network communication issued by the network communication agent contains the UID, and
wherein the service device operates:
   v. on receipt of a new key-value bundle, to store the key-value bundle in its local data-store, and propagate that key-value bundle to all other service devices on the service network, and
   vi. on receipt of a network communication from the network communication agent located on a client device, to:
      A. extract the UID from the request issued by the network communication agent
      B. interrogate its data-store for information associated with that UID, such information being essential to the provision of the network processing service, and
      C. perform the requested service described in the network communication and issue a network communication in turn to the client device with a response that corresponds with the requested service.

41. One or more computer storage devices comprising one or more computer readable mediums, the one or more computer readable mediums comprising a computer program code that, when run on a computer or computer network, causes the computer or network to operate in accordance with a method according to claim 1.

42. An Internet-level network processing service operable in accordance with the method according to claim 1.

43. The Internet-level network processing service operable according to claim 42, further comprising a web security service.

44. The Internet-level network processing service according to claim 43, further comprising any one or more of web virus scanning, web filtering and web spyware screening.

* * * * *